(12) United States Patent
Thomas et al.

(10) Patent No.: US 6,356,959 B1
(45) Date of Patent: Mar. 12, 2002

(54) STACKABLE PCI PERIPHERAL DEVICES

(75) Inventors: Keith C. Thomas, Vermillion; Rix S. Chan, Dakota Dunes, both of SD (US); Bruce A. Young, LeMars, IA (US)

(73) Assignee: Gateway, Inc., N. Sioux City, SD (US)

( * ) Notice: Subject to any disclaimer, the term of this patent is extended or adjusted under 35 U.S.C. 154(b) by 0 days.

(21) Appl. No.: 09/119,838

(22) Filed: Jul. 21, 1998

(51) Int. Cl.[7] .................. G06F 3/00; G06F 13/12; G06F 13/38; G06F 13/00

(52) U.S. Cl. .................. 710/2; 710/8; 710/31; 710/62; 710/102

(58) Field of Search .................. 710/2, 8, 62, 64, 710/72, 102, 129, 31, 101

(56) References Cited

U.S. PATENT DOCUMENTS

| | | | |
|---|---|---|---|
| 5,201,038 A | * 4/1993 | Fielder | 395/325 |
| 5,379,192 A | * 1/1995 | Lievin | 361/785 |
| 5,446,869 A | * 8/1995 | Padgett et al. | 395/500 |
| 5,530,887 A | * 6/1996 | Harper et al. | 710/104 |
| 5,611,057 A | * 3/1997 | Pecone et al. | 710/102 |
| 5,628,637 A | * 5/1997 | Pecone et al. | 439/74 |
| 5,828,899 A | * 10/1998 | Richard et al. | 710/8 |
| 5,887,145 A | * 3/1999 | Harari et al. | 710/102 |
| 5,963,464 A | * 10/1999 | Dell et al. | 365/52 |
| 5,991,830 A | * 11/1999 | Beard et al. | 710/18 |

OTHER PUBLICATIONS

"Stacking single inline memory module card", IBM Technical Disclosure Bulletin, Oct. 1994, pp. 353–354.*

* cited by examiner

Primary Examiner—Thomas Lee
Assistant Examiner—Chun Cao
(74) Attorney, Agent, or Firm—Kenneth J. Cool; Charles A. Lemaire; Schwegman, Lundberg, Woessner & Kluth

(57) ABSTRACT

Apparatus and method for PCI bus extension, via a PCI bridge circuit, as well as PCI device function, via a PCI device circuit and I/O connector, all on a single I/O card. Further, the present invention provides for stackable, partial-height PCI cards. Further, provided are stackable, partial-height I/O card mounting plates. In yet another embodiment, a functional PCI extension card also provides one or more right-angle connector sockets in order to allow multiple additional PCI cards at right angles to the functional PCI extension card.

27 Claims, 16 Drawing Sheets

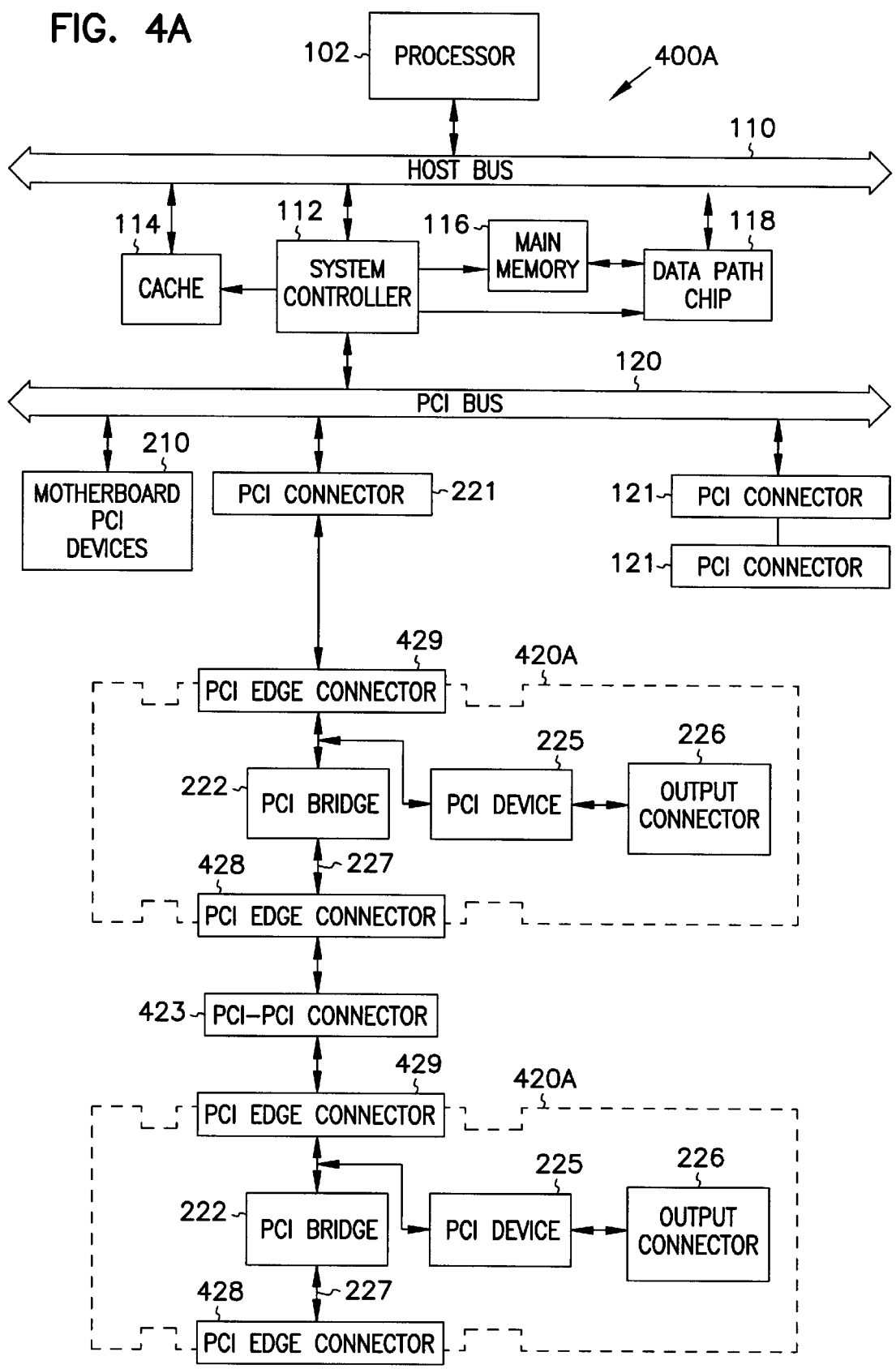

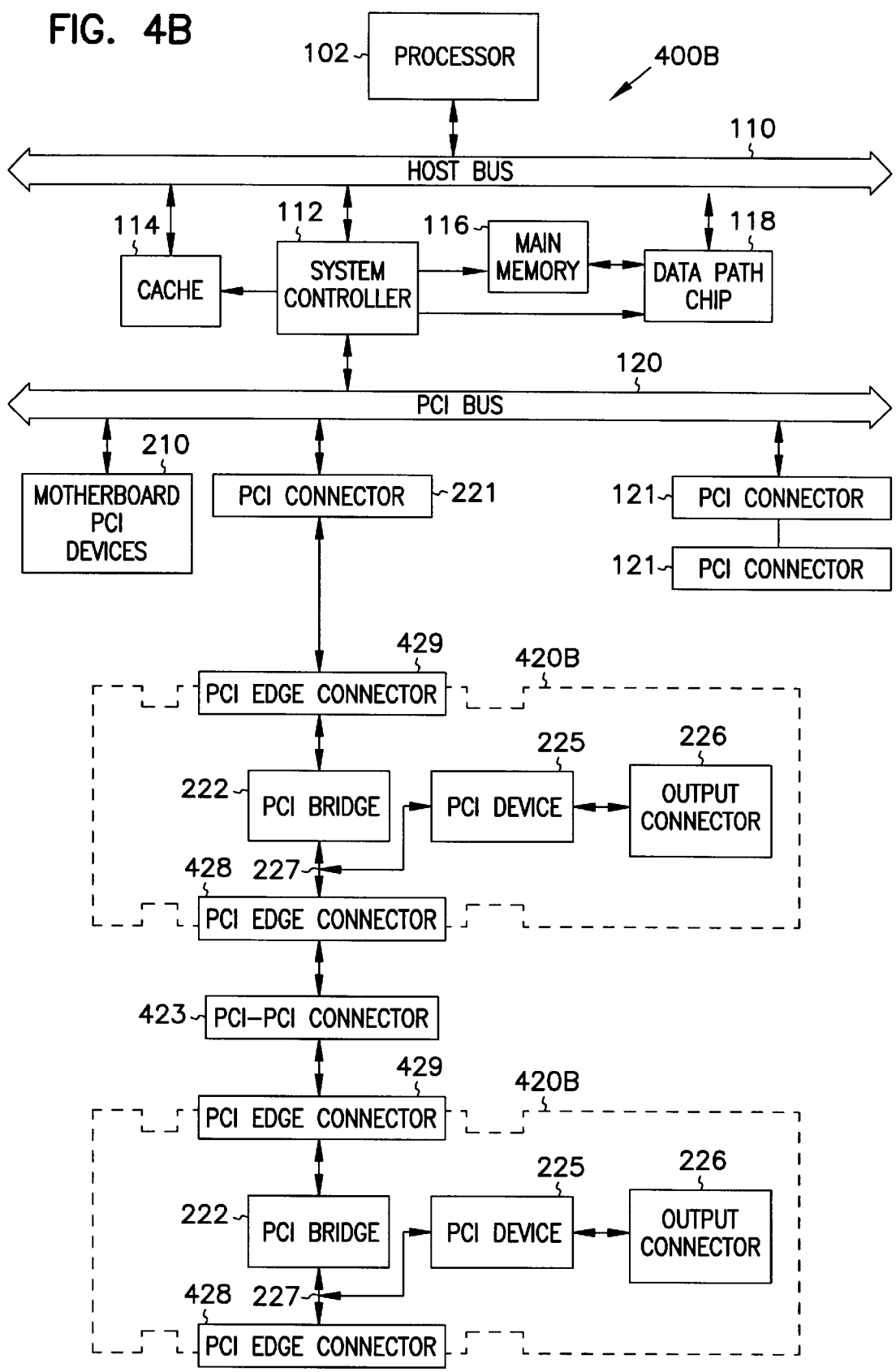

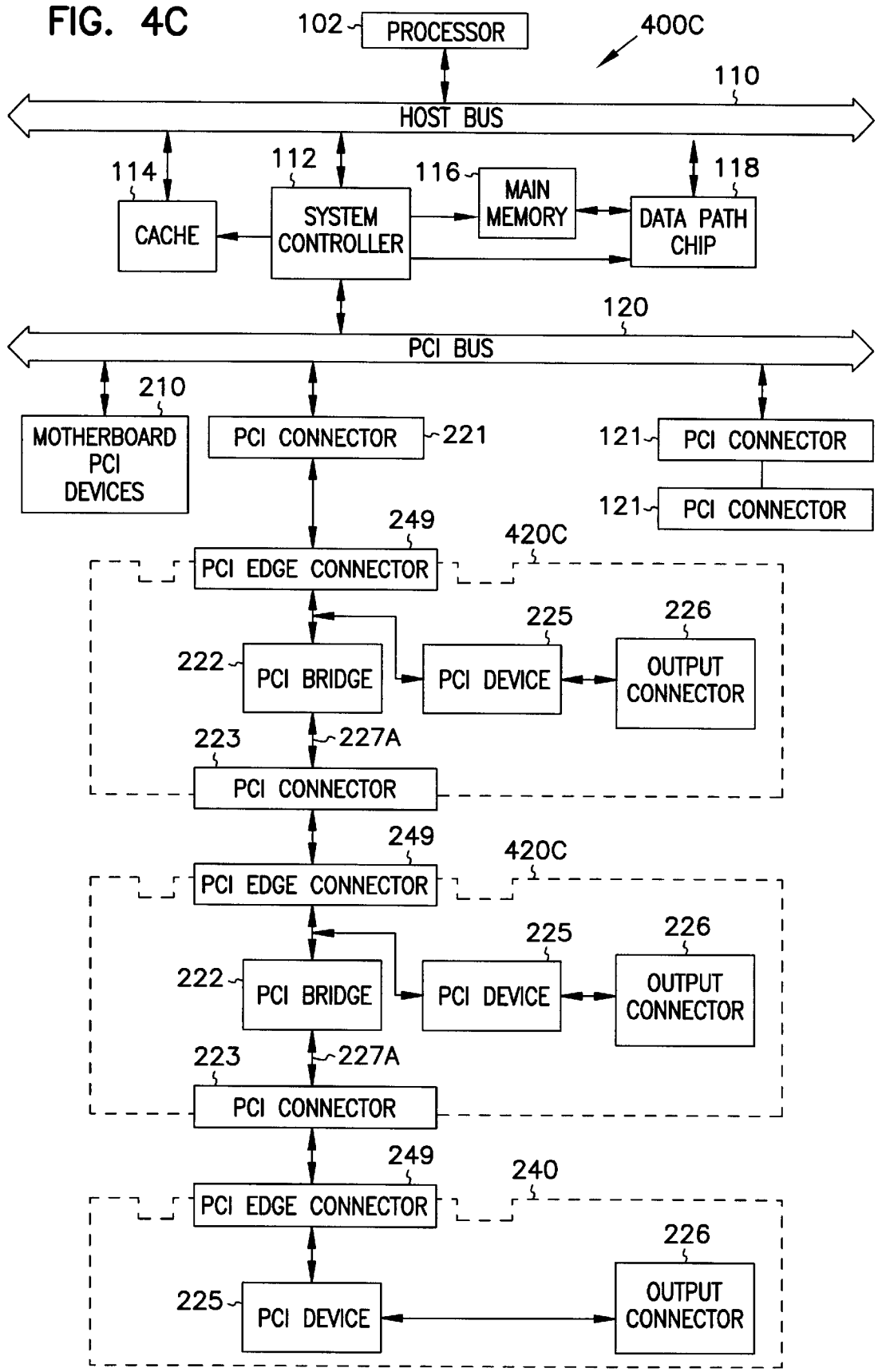

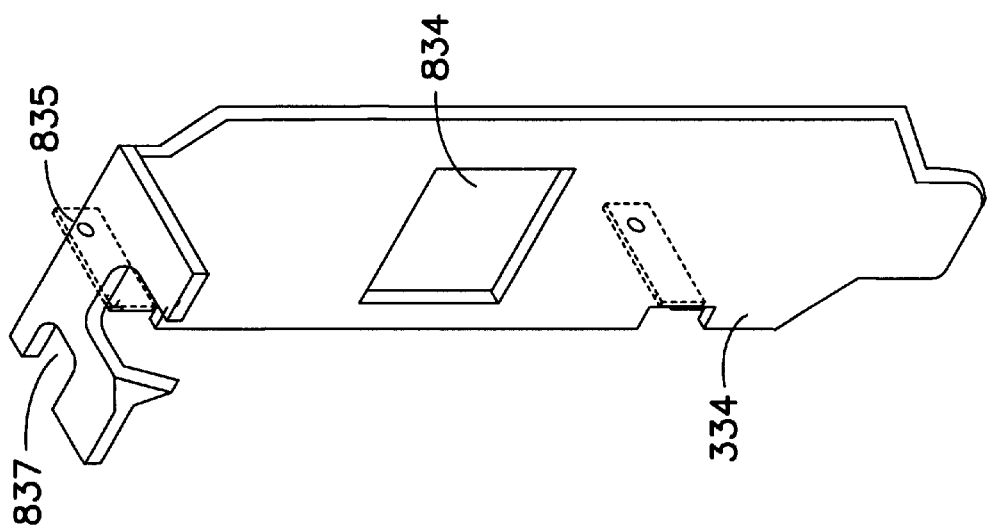
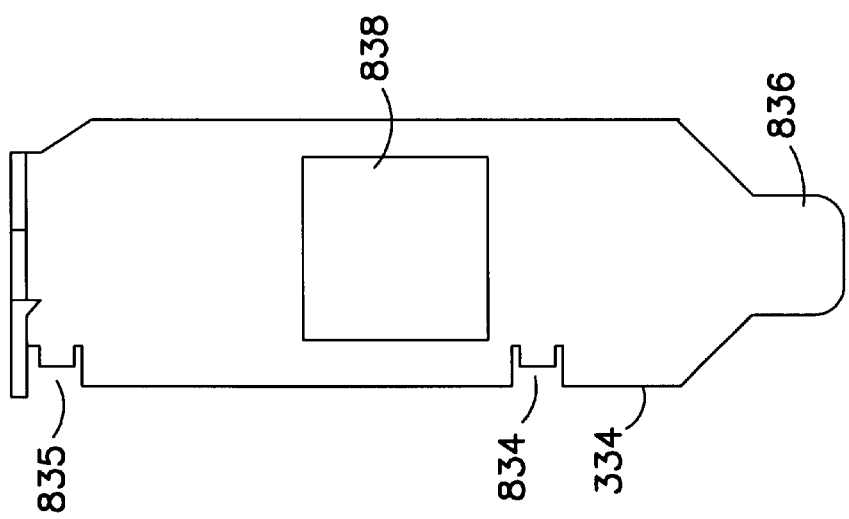
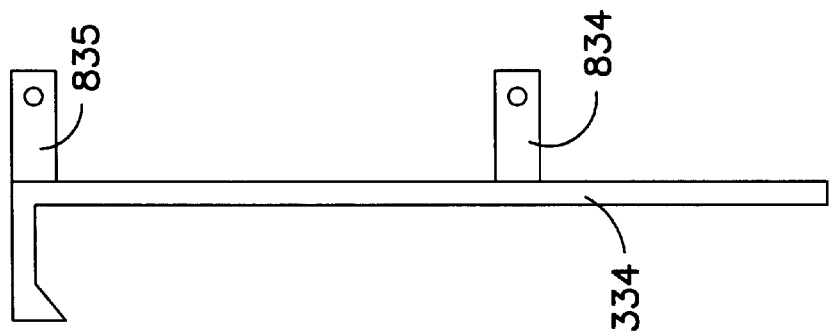

STACKABLE PCI PERIPHERAL DEVICES

FIELD OF THE INVENTION

The present invention is related to computer option cards for personal computers and in particular to an apparatus and method for stacking two or more PCI (Peripheral Component Interconnect)-type cards in a single full-height PCI space in a personal computer.

BACKGROUND OF THE INVENTION

As computer systems have become more common in the workplace and in the home, there has become a need to make these computer systems more adaptable and interchangeable to allow the customization of a computer system to a particular user's needs. Also, it has become necessary to enable the user to change functions or to add new functions to the computer system. These functions can be provided through software or hardware. When a new hardware function is added to a computer system, the electronics for implementing this function are often contained in a self-contained, pluggable, option card.

The option card contains a circuit card mounted with a variety of electronic components that implement the required electronic function. For example, the option card may provide a processor, expanded memory, an I/O card, a sound card, a network adaptor, or a video card or other functions or combinations of functions. This circuit card is attached to a mounting plate (sometimes known as a "bracket") and has a card-edge connector along the edge of the electronics package. An electronics package thus constructed is easily configured in a computer system by inserting the package into a provided slot in a "card cage" and engaging the connector at the edge of the electronics package with a mating connector on the backplane of the computer system. The computer system backplane provides an appropriate interface for the electronics package to be integrated within the computer system.

The computer industry has developed a standard size and form factor for many option cards used in personal computers. In particular, manufacturers of components for IBM-compatible-type personal computers have a standard form factor and electrical interface specifications for PCI-type (Peripheral Component Interconnect-type) cards. The standard form factor includes such factors as the size, shape and position of the mounting plate, the size, shape and position of the edge-card connector, etc. The electrical specification includes specifications for the number, position, speed, and functionality of data, address, and control signals.

As evolutionary changes in integrated circuit function and size has enabled more and more function to be placed in a single chip, and as surface-mount technology has become commonplace, the amount of card "real estate" needed for a particular function has decreased remarkably. Thus, functions that only a few years ago took a fairly large I/O card to contain, can now be packaged on a small portion of a small option card. Manufacturers, however, are constrained in trying to reduce the size of cards by their need to remain compatible with previous-generation cards, in order to plug into existing systems and achieve economies of scale.

Therefore, there is a need for apparatus and method for stacking two or more PCI-type cards in a single PCI space in a personal computer. Further, there is a need for providing multiple selectable or optional functions in a single slot in a personal computer.

SUMMARY OF THE INVENTION

The present invention provides apparatus and a method for PCI bus extension, via a PCI bridge circuit, as well as PCI device function, via a PCI device circuit and I/O connector, all on a single I/O card. Further, the present invention provides for stackable, partial-height PCI cards. Further, the present invention provides for stackable, partial-height I/O card mounting plates. In yet another embodiment, a functional PCI extension card also provides one or more right-angle connector sockets in order to allow multiple additional PCI cards at right angles to the functional PCI extension card. One aspect of the present invention is to add one or more PCI device functions to such a PCI extender card. Another aspect of the present invention is to make such a PCI function-plus-bus-extension card on a partial-height card (such as a half-height or one-third-height card that can be stacked edge-to-edge).

In one embodiment, a stackable input-output card is provided for a computer having a motherboard, the motherboard having a first system bus. The stackable card includes a first connector on the stackable card that connects to the first system bus. A bus bridge circuit is wired to the first connector in order to couple the bus bridge circuit to the first system bus. The bus bridge circuit generates a second system bus that is compatible with cards designed for the first system bus. A second connector on the stackable card is connected to the second system bus. The stackable card also includes a device circuit wired to either the first system bus or the second system bus, where the device circuit provides an input/output function. Finally, an input/output connector on the stackable card is connected to the device circuit, wherein the device circuit drives signals, receives signals, or both, through the input/output connector.

In one such embodiment, the first system bus is a PCI bus, the second system bus is a PCI bus, and the bus bridge circuit includes a PCI bridge circuit.

In another such embodiment, the second connector is a male PCI card-edge connector. In yet another embodiment, the second connector is a female PCI socket connector mounted to an edge distal to the first connector to accept another stackable option card, where both cards lie in a single plane when connected. In still another embodiment, the second connector is a female PCI socket connector mounted to a surface of the stackable card to accept another stackable option card, where the cards are perpendicular to one another when connected.

Another aspect of the present invention is a stackable input-output card mounting plate set for mounting one or more option cards to a computer. The plate set includes a first stackable plate that is generally flat with a first generally planar surface and a second generally planar surface opposite the first planar surface and having a long dimension generally along two sides, and a short dimension generally along two ends, the long dimension being longer than the short dimension. The first stackable plate includes a tongue formed on a first end of the first plate, one or more card-attachment tabs formed along a side of the first plate to attach to one of the option cards, a slot formed near a second end of the plate, the slot sized to accept a tongue of a second plate, the slot having a first edge located closest to the first end of the plate, and a second edge located closest to the second end of the plate, and ends of the slot located closest to the sides of the plate, and a deformation of the plate at the ends of the slot such that at least a portion of the first planar surface adjacent the second edge of the slot is coplanar or close to coplanar with at least a portion of the second planar surface adjacent the first edge of the slot.

In one such embodiment of the first plate, when the second plate tongue is inserted into the slot and the second plate is moved to be generally coplanar with the plate, then the second plates tongue is in spring tension against the second planar surface.

Another such embodiment of the plate set further includes a hold-down screw plate, the hold-down screw plate including: a tongue formed on a first end of the hold-down screw plate, a screw slot formed on a side near a second end of the hold-down screw plate, the slot sized to accept a hold-down screw, and an essentially right-angle bend located between the tongue and the screw slot of the hold-down screw plate.

Yet another such embodiment of the plate set further includes a second stackable plate wherein the second stackable plate is essentially identical to the first stackable plate.

Still another such embodiment of the plate set further includes a second stackable plate wherein the second stackable plate includes a tongue formed on a first end of the second plate, one or more card-attachment tabs formed along a side of the second plate to attach to one of the option cards, a screw slot formed on a side near a second end of the plate, the slot sized to accept a hold-down screw, and an essentially right-angle bend located between the tongue and the screw slot of the second plate.

Another aspect of the present invention is a method for stacking input-output cards for a computer having a motherboard, the motherboard having a first system bus. The method includes the steps of: connecting a first connector of a first stackable card to the first system bus, wiring a bus bridge circuit to the first connector in order to couple the bus bridge circuit to the first system bus, generating a second system bus from the bus bridge circuit, the second system bus being compatible with cards designed for the first system bus, connecting a second stackable card to the second system bus, wiring a device circuit to either the first system bus or the second system bus, the device circuit providing an input/output function, and connecting an input/output connector on the first card connected to the device circuit, wherein the device circuit drives signals, receives signals, or both, through the input/output connector.

BRIEF DESCRIPTION OF THE DRAWINGS

FIG. 4A is a block diagram of a computer system 400A according to the present invention, including two symmetrical stacked PCI cards.

FIG. 4B is a block diagram of a computer system 400B according to the present invention, including two symmetrical stacked PCI cards.

FIG. 4C is a block diagram of a computer system 400C according to the present of invention, including two symmetrical stacked PCI cards.

FIGS. 8A, 8B, and 8C are edge, back, and isometric views, respectively, of mounting plate 334 of one embodiment.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1:
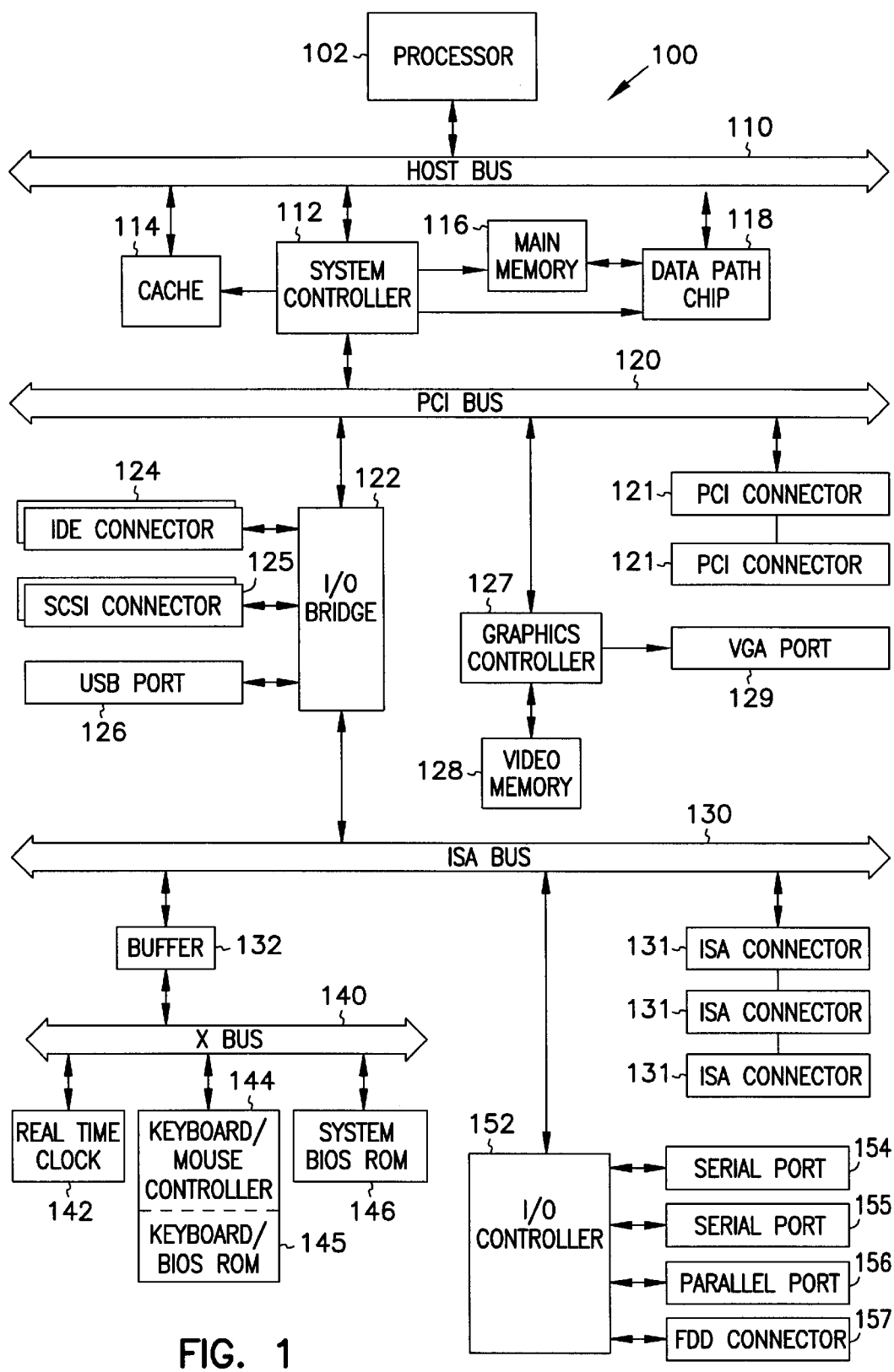
FIG. 1 is a block diagram of a computer system 100 according to the present invention.

FIG. 1 shows a block diagram of a computer system 100 according to the present invention. In this embodiment, processor 102, system controller 112, cache 114, and data-path chip 118 are each coupled to host bus 110. Processor 102 is a microprocessor such as a 486-type chip, a Pentium®, Pentium II® or other suitable microprocessor. Cache 114 provides high-speed local-memory data (in one embodiment, for example, 512 KB of data) for processor 102, and is controlled by system controller 112, which loads cache 114 with data that is expected to be used soon after the data is placed in cache 114 (i.e., in the near future). Main memory 116 is coupled between system controller 112 and data-path chip 118, and in one embodiment, provides random-access memory of between 16 MB and 128 MB of data. In one embodiment, main memory 116 is provided on SIMs (Single In-line Memory Modules), while in another embodiment, main memory 116 is provided on DIMMs (Dual In-line Memory Modules), each of which plugs into suitable sockets provided on a motherboard holding many of the other components shown in FIG. 1. Main memory 116 includes standard DRAM (Dynamic Random-Access Memory), EDO (Extended Data Out) DRAM, SDRAM (Synchronous DRAM), or other suitable memory technology. System controller 112 controls PCI (Peripheral Component Interconnect) bus 120, a local bus for system 100 that provides a high-speed data path between processor 102 and various peripheral devices, such as graphics devices, storage drives, network cabling, etc. Data-path chip 118 is also controlled by system controller 112 to assist in routing data between main memory 116, host bus 110, and PCI bus 120.

In one embodiment, PCI bus 120 provides a 32-bit-wide data path that runs at 33 MHZ. In another embodiment, PCI bus 120 provides a 64-bit-wide data path that runs at 33 MHZ. In yet other embodiments, PCI bus 120 provides 32-bit-wide or 64-bit-wide data paths that run at higher speeds. In one embodiment, PCI bus 120 provides connectivity to I/O bridge 122, graphics controller 127, and one or more PCI connectors 121 (i.e., sockets into which a card edge may be inserted), each of which accepts a standard PCI card. In one embodiment, I/O bridge 122 and graphics controller 127 are each integrated on the motherboard along with system controller 112, in order to avoid a board-connector-board signal-crossing interface and thus provide better speed and reliability. In the embodiment shown, graphics controller 127 is coupled to a video memory 128 (that includes memory such as DRAM, EDO DRAM, SDRAM, or VRAM (Video Random-Access Memory)), and drives VGA (Video Graphics Adaptor) port 129. VGA port 129 can connect to industry-standard monitors such as VGA-type, SVGA (Super VGA)-type, XGA-type (extended Graphics Adaptor) or SXGA-type (Super XGA) display devices. Other input/output (110) cards having a PCI interface can be plugged into PCI connectors 121.

In one embodiment, I/O bridge 122 is a chip that provides connection and control to one or more independent IDE connectors 124–125, to a USB (Universal Serial Bus) port 126, and to ISA (Industry Standard Architecture) bus 130. In this embodiment, IDE connector 124 provides connectivity for up to two standard IDE-type devices such as hard disk drives, CDROM (Compact Disk-Read-Only Memory) drives, DVD (Digital Video Disk) drives, or TBU (Tape-Backup Unit) devices. In one similar embodiment, two IDE connectors 124 are provided, and each provide the EIDE (Enhanced IDE) architecture. In the embodiment shown, SCSI (Small Computer System Interface) connector 125 provides connectivity for up to seven or fifteen SCSI-type devices (depending on the version of SCSI supported by the embodiment). In one embodiment, I/O bridge 122 provides ISA bus 130 having one or more ISA connectors 131 (in one embodiment, three connectors are provided). In one embodiment, ISA bus 130 is coupled to I/O controller 152, which in turn provides connections to two serial ports 154 and 155, parallel port 156, and FDD (Floppy-Disk Drive) connector 157. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146.

FIG. 1 shows one exemplary embodiment of the present invention, however other bus structures and memory arrangements are specifically contemplated.

As used in the present description and claims, an "option card" is a card that may be added or changed in a computer system. For example, the option card may provide a processor, expanded memory, an I/O card (such as serial, parallel, and/or floppy-disk ports), a sound board, a network adaptor, digital signal processor card, modem card, or a video card, or other functions or combinations of functions.

It is often untenable to insert a PCI bus extension card that merely adds length and a number of PCI female sockets into which more than one other PCI cards are inserted, because the PCI bus architecture has strict requirements as to length and loading of its signals, and adding length or loads will cause instability or malfunction. Adding a PCI bus extender card which includes a PCI bridge circuit plus a plurality of PCI female sockets allows more than one PCI card to be added to a computer system, however having only the PCI bridge chip and the sockets on such an extender card can leave much of the printed-circuit card unused. Such printed-circuit "real estate" inside a personal computer enclosure is valuable. One aspect of the present invention is to add one or more PCI device functions to such a PCI extender card. Another aspect of the present invention is to make such a PCI function-plus-bus-extension card on a partial-height card (such as a half-height or one-third-height card that can be stacked edge-to-edge).

Figure 2A:
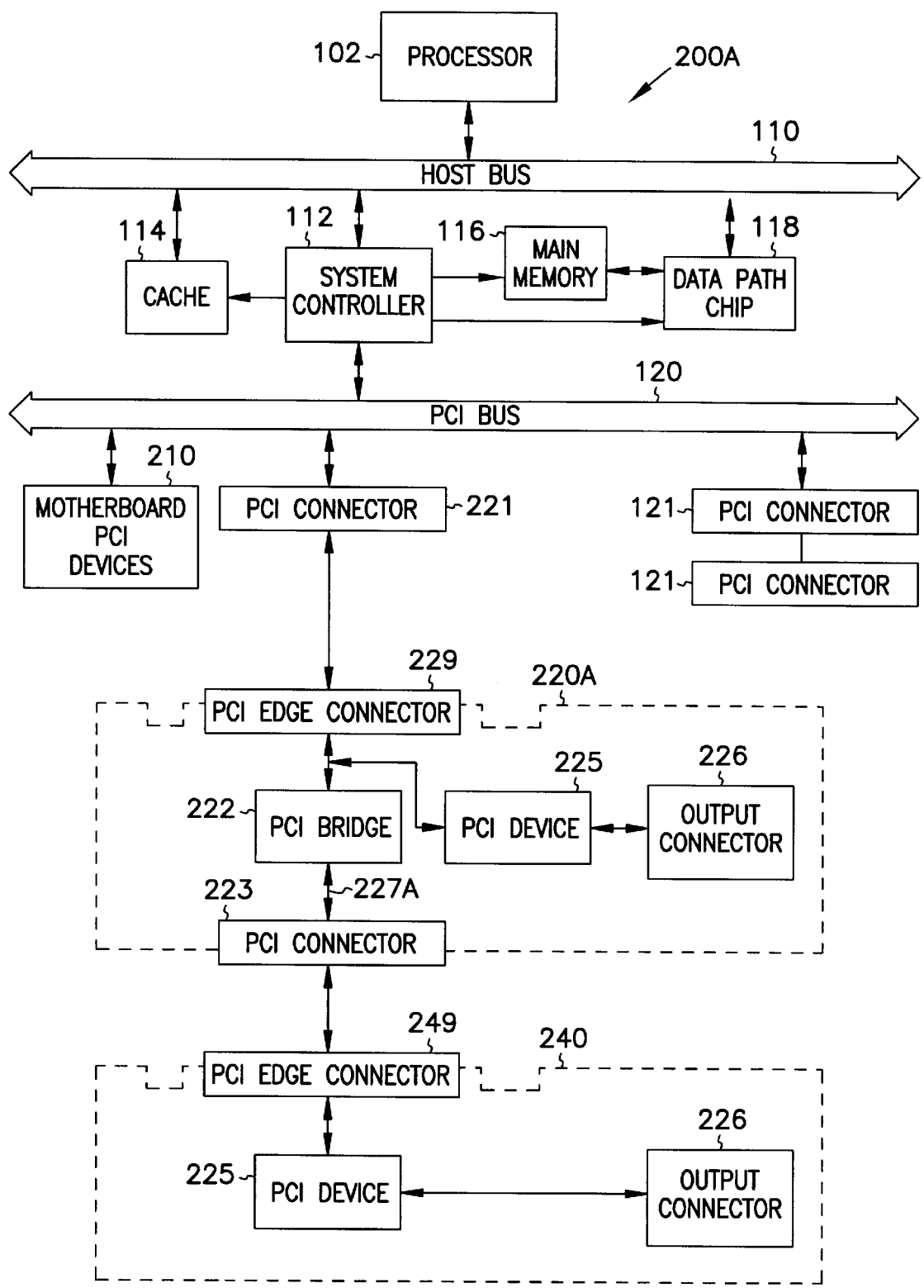
FIG. 2A is a block diagram of a computer system 200A according to the present invention, including two unsymmetrical stacked PCI cards.
Figure 2B:
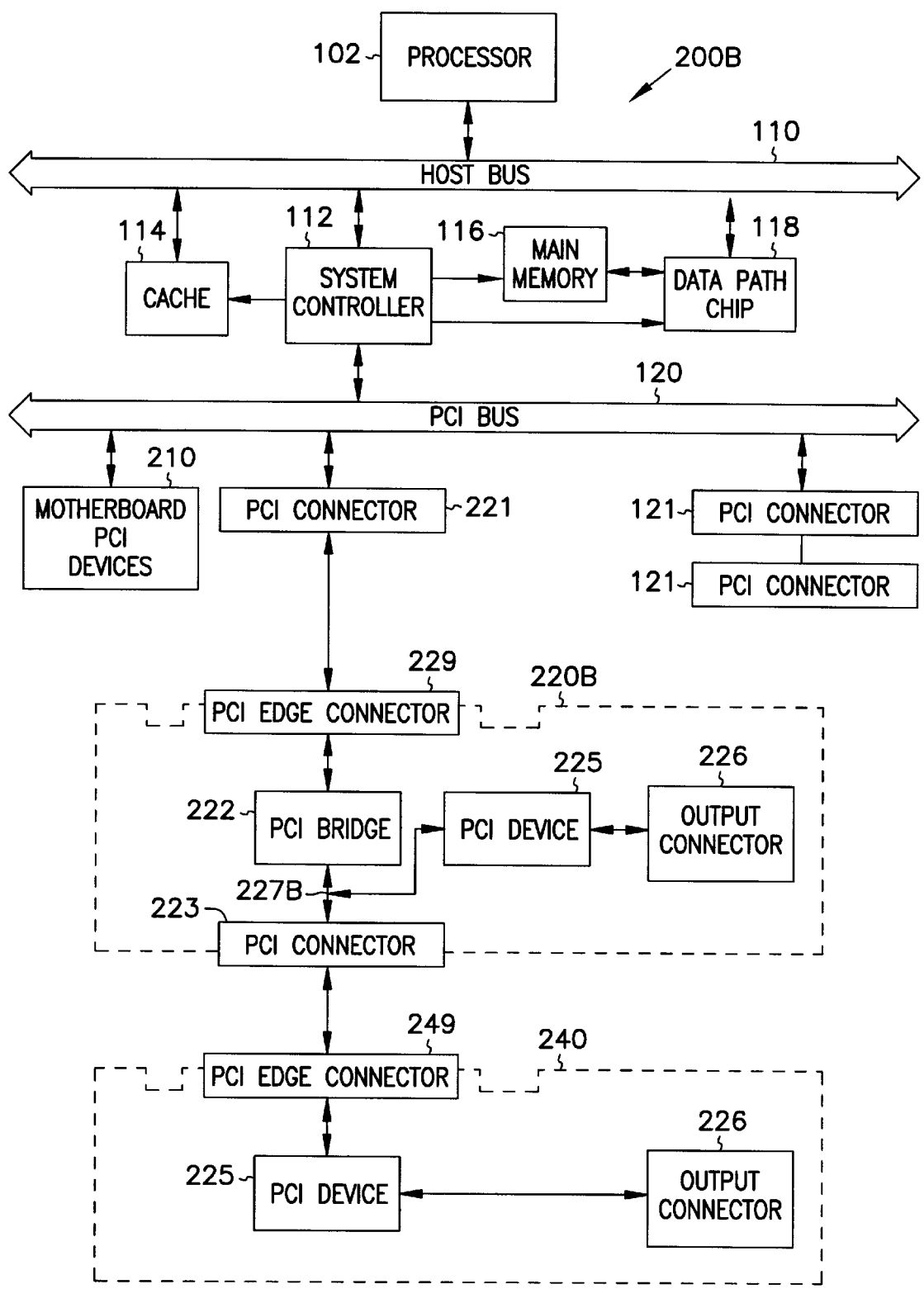
FIG. 2B is a block diagram of a computer system 200B according to the present invention, including two unsymmetrical stacked PCI cards.

FIG. 2A is a block diagram of a computer system 200A according to the present invention, including two unsymmetrical stacked PCI cards. FIG. 2B is a block diagram of a similar computer system 200B according to the present invention, including two unsymmetrical stacked PCI cards. Partial-height card 220A of FIG. 2A (and similarly partial-height card 220B of FIG. 2B) includes PCI edge connector 229, PCI Bridge circuit 222, PCI connector 227 that is wired to the output of PCI bridge circuit 222, PCI device 225, and output connector 226. Partial-height card 240 includes PCI edge connector 249, PCI device 225, and output connector 226.

Partial-height card 220A is wired so that PCI bridge circuit 222 and PCI device circuit 225 are both driven by PCI bus 120 of motherboard 392 (see FIG. 3), i.e., PCI device circuit 225 is coupled to input PCI connector 229 (thus reducing the loading on PCI bus 227 as compared to the circuit of FIG. 2B).

In contrast, partial-height card 220B is wired so that only PCI bridge circuit 222 is driven by PCI bus 120 of motherboard 392 (see FIG. 3) (thus reducing the loading on PCI bus 120 as compared to the circuit of FIG. 2A), and PCI device circuit 225 and PCI female connector 223 are both on the output PCI bus 227 of PCI bridge circuit 222, i.e., PCI device circuit 225 and output PCI connector 223 are both coupled to secondary PCI bus 227. The choice between the embodiments of FIG. 2A and FIG. 2B depends on whether the designer desires PCI bus 120 or PCI bus 227 to have the extra loading. In all other ways, computer systems 200A and 200B are the same and are referred to as computer system 200. Similarly, partial-height cards 220A and 220B are otherwise the same and are referred to as partial-height cards 220.

The block motherboard PCI devices 210 is meant to include all blocks of FIG. 1 shown below the PCI bus 120. PCI connector 221 is a female socket on the motherboard 392 (see FIG. 3) into which a male PCI card-edge connector 229 may be inserted, and is one of the one or more PCI connectors 121 shown in FIG. 1. PCI card-edge connector 229 typically includes a plurality of gold-plated fingers on the surface of the card edge of card 220 (see FIG. 3) which make electrical and mechanical connection to PCI connector socket 221 when plugged in. In one embodiment, card 220 is made to be one-half high, in order that two suitable cards can be "stacked" (plugged into one another), and then together plugged into motherboard 392. In another such embodiment, partial-height card 220 is made one-third as high as a full-height PCI card, such that three such cards might be stacked edge-to-edge, or such that a two-thirds-high card (i.e., a card that needed more real estate than a one-half card, but that did not require a full-height card) can be stacked on a one-third-high card. PCI card-edge connector 229 is wired to PCI bridge circuits 222. PCI bridge circuit 222 provides control and timing signals in order to extend the PCI bus to PCI connector socket 223, as well as connecting an on-card PCI bus to one or more PCI device circuits 225, each of which in turn is connected to one or more suitable input/output connectors 226, if appropriate, to which external cabling (or other devices such as antennas) can be connected. In the embodiment shown in FIG. 2 and FIG. 3, partial-height card 220 is designed to be the "bottom" card (the one that is plugged into the motherboard 392) and includes PCI bridge circuit 222, whereas partial-height card 240 is designed to be the "top" card (the one that is plugged into the motherboard 392 alone, or onto the PCI connector socket 223 of a bottom card) and does not include PCI bridge circuit 222. (Other than the use of the stackable partial-height PCI cards 220 and 240, computer system 200 is identical to computer system 100.)

Figure 3:
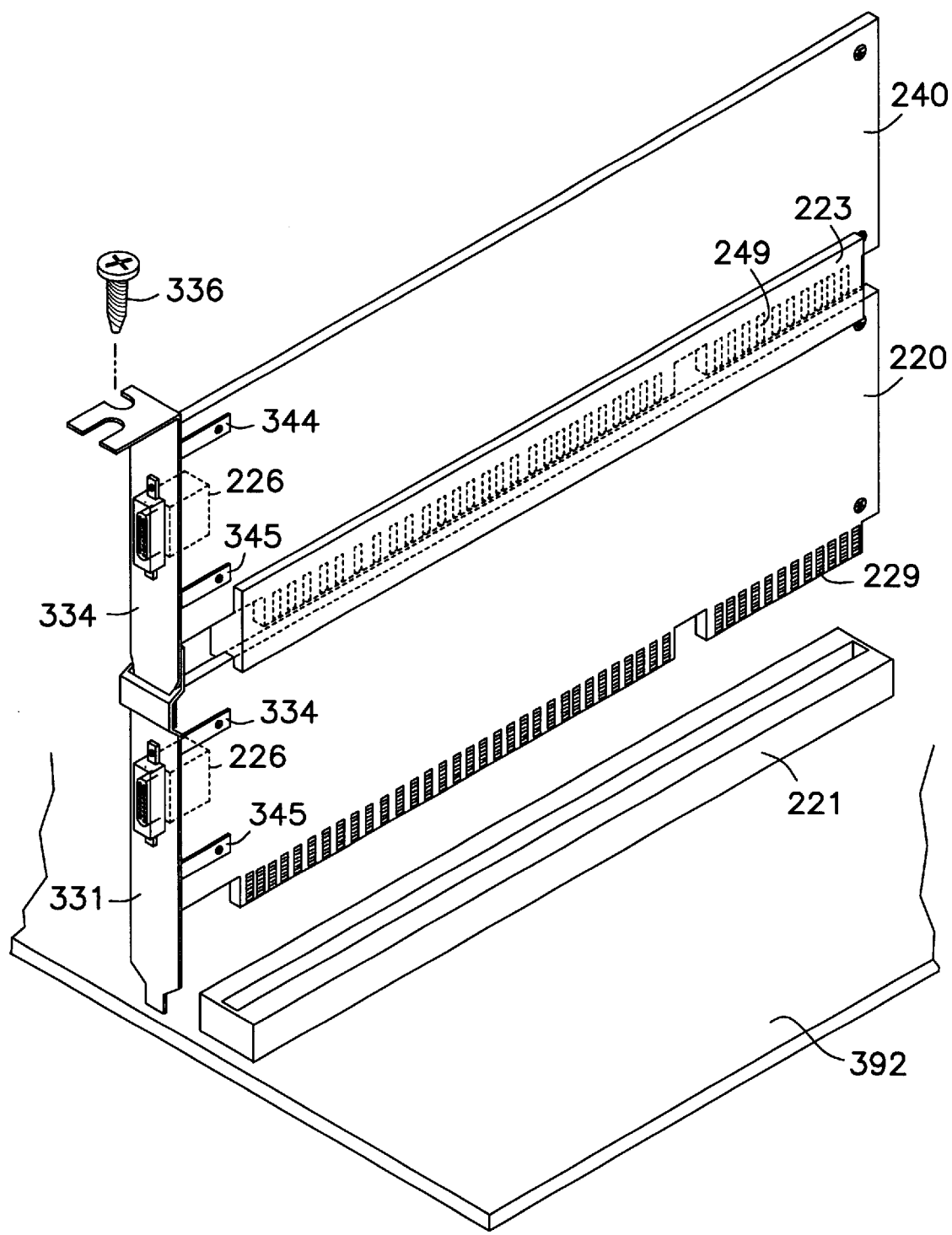
FIG. 3 is an isometric view of two stacked unsymmetrical partial-height PCI cards 220 and 240.

FIG. 3 is an isometric view of two stacked unsymmetrical PCI partial-height cards 220 and 240. These are termed "unsymmetrical" since partial-height card 220 can be used in either the bottom or top positions since it has a bridge circuit 222, whereas partial-height card 240 is designed to be the "top" card (the one that is plugged onto the PCI connector socket 223 of a bottom card) (the plate 334 of card 240 as shown in FIG. 3 might make it unsuitable or difficult to use alone, although the electrical configuration is suitable for use alone when the mounting plate 334 is replaced with a suitable one). Lower mounting plate 331 (shown in more detail in FIGS. 7A, 7B, and 7C) is designed with a slot 732 to accommodate the tongue or tab (e.g., 736 or 836) of an upper mounting plate (e.g., 331 or 334). In this embodiment, socket 223 is permanently mounted (e.g., soldered, glued and/or bolted) to the top edge of partial-height card 220, in order to receive the PCI card-edge connector 249 of partial-height card 240. Both partial-height card 220 and partial-height card 240 are provided with the appropriate input/output connector 226, and their mounting plates 331 and 334, respectively, are provided with corresponding openings (i.e., for cables that connect to these input/output connectors 226) as needed.

FIG. 4A is a block diagram of a computer system 400A according to the present invention, including two symmetrical stacked partial-height PCI cards 420A. FIG. 4B is a block diagram of a computer system 400B according to the present invention, including two symmetrical stacked partial-height PCI cards 420B. Each partial-height card 420A is wired so that PCI bridge circuit 222 and PCI device circuit 225 are both driven by PCI bus 120 of motherboard 392 (see FIG. 3), i.e., PCI device circuit 225 is coupled to input PCI connector 429 (thus reducing the loading on PCI bus 227 as compared to the circuit of FIG. 2B). In contrast, partial-height card 220B is wired so that only PCI bridge circuit 222 is driven by PCI bus 120 of motherboard 392 (see FIG. 3) (thus reducing the loading on PCI bus 120 as compared to the circuit of FIG. 2A), and PCI device circuit 225 and PCI male connector 428 are both on the output PCI bus 227 of PCI bridge circuit 222, i.e., PCI device circuit 225 and output PCI connector 223 are both coupled to secondary PCI bus 227. The choice between FIG. 4A and FIG. 4B depends on whether the designer desires PCI bus 120 or PCI bus 227 to have the extra loading. In all other ways, computer systems 400A and 400B are the same and are referred to as computer system 400. Similarly, partial-height cards 420A and 420B are otherwise the same and are referred to as partial-height cards 420.

In this embodiment, symmetrical PCI partial-height cards 420 are designed so that either can be in the top-mounted card position or the bottom-mounted card position, and in this embodiment, each has a PCI card-edge connector and the identical mounting plate 331 is mounted on each. PCI-to-PCI double socket connector 423 connects each pin at the top of the bottom card 420 to the corresponding pin at the bottom of top card 420.

Figure 5A:
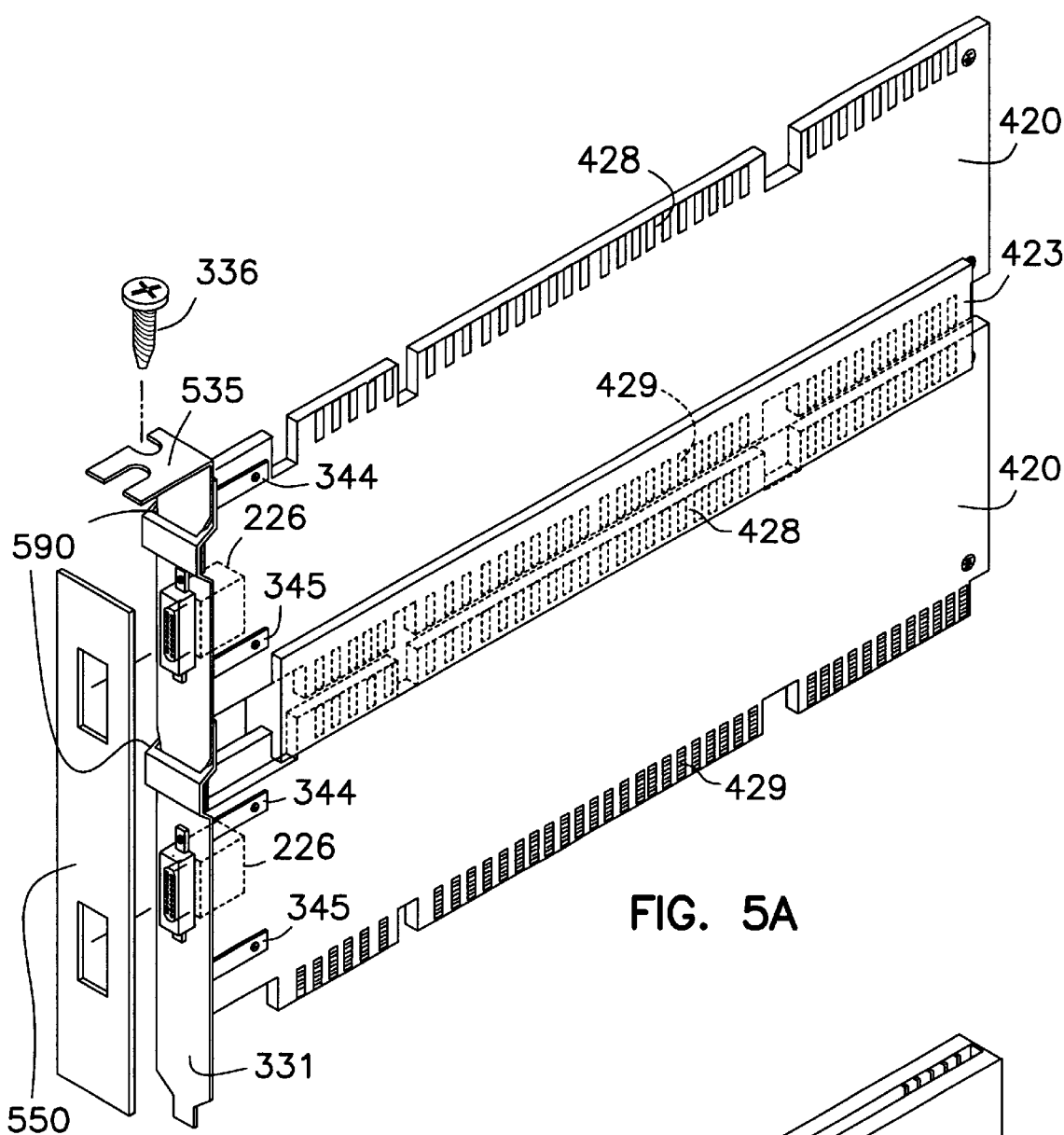
FIG. 5A is an isometric view of two stacked symmetrical partial-height PCI cards 220 and 240.
Figure 5B:
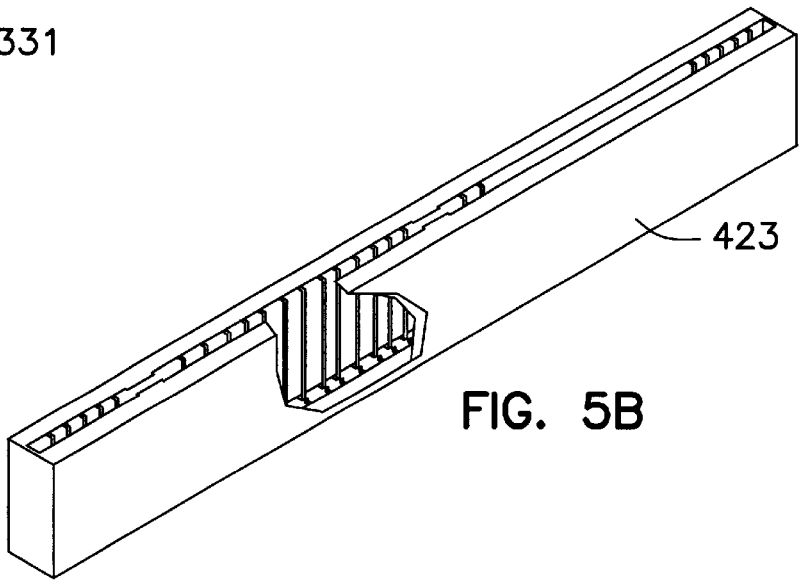
FIG. 5B is an isometric view, partially cutaway, of female-female connector socket 423.

FIG. 5A is an isometric view of two stacked symmetrical PCI cards 420 and 420, as described above for FIG. 4. In the embodiment shown (see FIG. 5A), hold-down screw plate 535 fits into the slot at the top of the top mounting plate 331 to provide a connection between hold-down screw 336 and the cabinet of computer system 400. In one embodiment, decorative backplate 550 is provided to give a unified appearance to the two half-high cards as assembled. In one such embodiment, backplate 550 is attached to plates 535 and 331 using a double-sided sticky flexible foam tape having adhesive on both sides. (Other than the use of the stackable partial-height PCI cards 420, computer system 400 is identical to computer system 100.) FIG. 5B is a schematic isometric view, part- ally cutaway, of female-female connector socket 423 which is used, in one embodiment, to interconnect stacked cards such as 220 and 240. In one such embodiment, a gold-plated connector is provided for each signal conductor of the PCI bus running between cards 220 and 240.

Figure 6C:
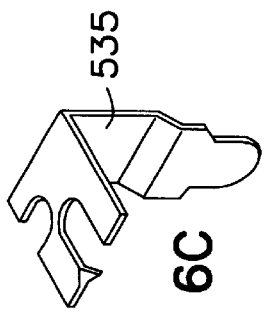
FIGS. 6A, 6B, and 6C are edge, back, and isometric views, respectively, of partial-height mounting plate 535 of one embodiment.
Figure 6B:
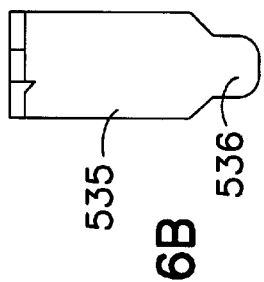
Figure 6A:
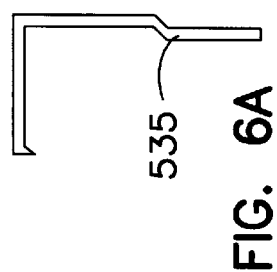

FIGS. 6A, 6B, and 6C are edge, back, and isometric views, respectively, of hold-down screw mounting plate 535 of one embodiment. The tongue 536 at the bottom of hold-down screw mounting plate 535 is shaped and positioned to fit into slot 732 of mounting plate 331 (see FIG. 7C). The height of mounting plate 535 is made so that when tongue 536 is mounted in the slot (e.g., slot 732 of plate 331 of FIG. 7A) of the plate of the top card, the top screw slots of plate 535 will be at the desired overall height for the assembled stacked card combination; for example, at the standard height to mount option cards into a standard personal computer.

Figure 7C:
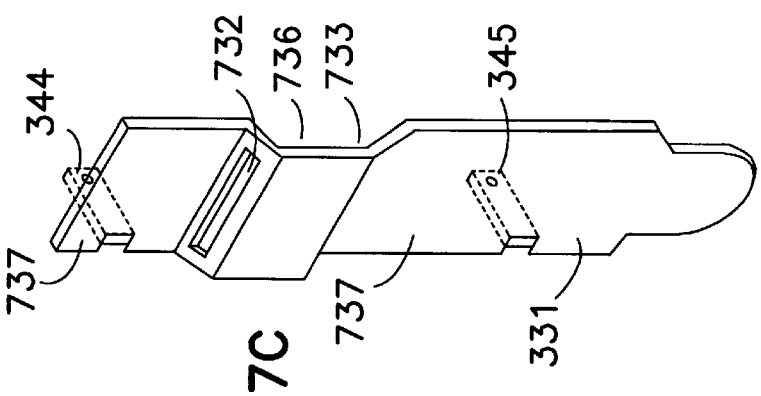
FIGS. 7A, 7B, and 7C are edge, back, and isometric views, respectively, of partial-height mounting plate 331 of one embodiment.
Figure 7B:
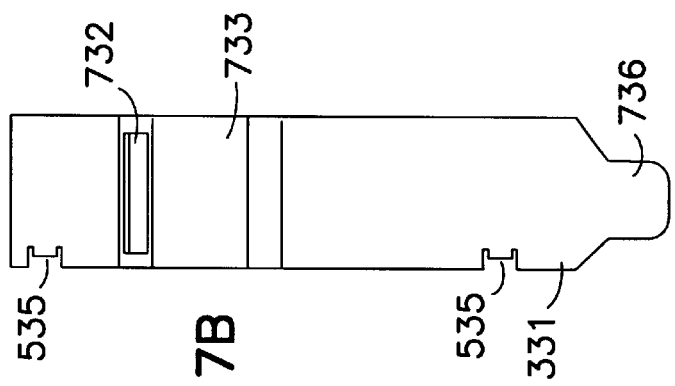
Figure 7A:
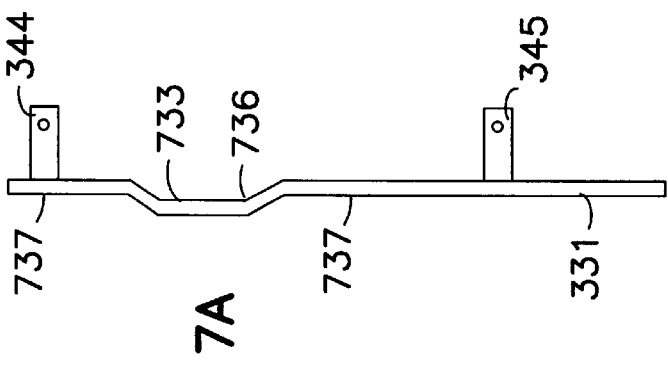

FIGS. 7A, 7B, and 7C are edge, back, and isometric views, respectively, of partial-height mounting plate 331 of one embodiment. In this embodiment, slot 732 is designed to receive the tongue 736 of the upper partial mounting plate 331 (or tongue 536 of hold-down screw mounting plate 535, or tongue 836 of top mounting plate 334). In one embodiment, depression 733 is formed only just deep enough (with inner wall 736 of depression 733 being formed parallel to outer wall 737 of the main body of plate 331, but not quite coplanar with wall 737) that, although tongue 736 can easily be inserted into slot 732 when the two plates are at an angle to one another, once the plates are moved to be parallel to one another and the card-edge connectors are pushed into the corresponding sockets (e.g., PCI card-edged connector 429 into socket 423), tongue 736 will be pressing firmly against the inside wall 736 of depression 733 (thus locking the two cards to one another).

Figure 7F:
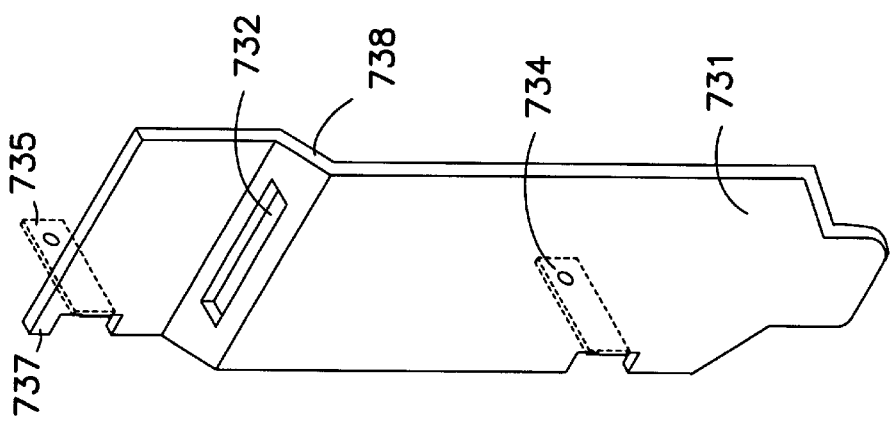
FIGS. 7D, 7E, and 7F are edge, back, and isometric views, respectively, of partial-height mounting plate 731 of one embodiment.
Figure 7E:
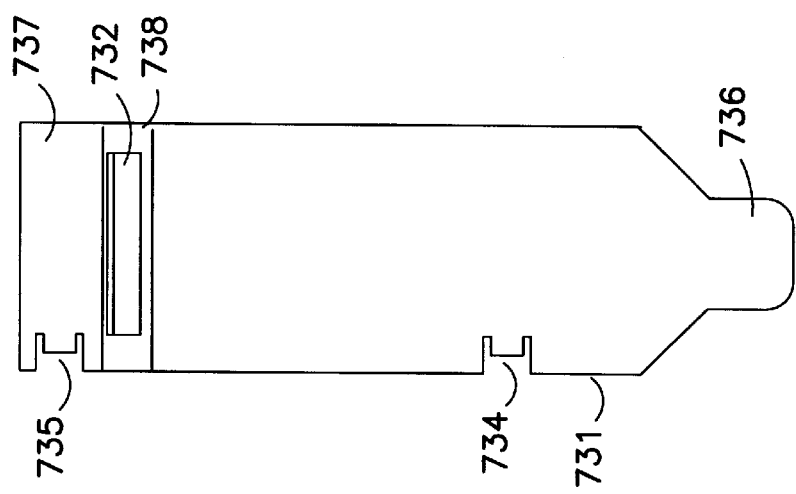
Figure 7D:
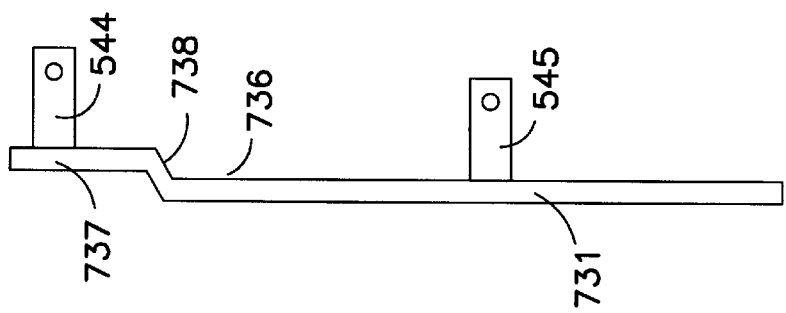

FIGS. 7D, 7E, and 7F are edge, back, and isometric views, respectively, of partial-height mounting plate 731 of one embodiment. In this embodiment, which is otherwise identical to plate 331 of FIGS. 7A, 7B, and 7C, only a single displacement bend set 738 is formed (rather than two as in plate 331), in order to save cost and/or time in manufacturing.

FIGS. 8A, 8B, and 8C are edge, back, and isometric views, respectively, of partial-height mounting plate 334 of one embodiment. in one such embodiment, top partial-height card 240 is made without a PCI bridge circuit 222 in order to save cost, and is fitted to top mounting plate 334 when it is to be the upper of two stacked PCI cards (see FIG.

2 and FIG. 3); otherwise, a standard full-length mounting plate is used instead. In FIGS. 8A, 8B, and 8C, partial-height mounting plate 334 is shown with tabs 834 and 835 which, in one embodiment, are attached with screws to card 240, tongue 836 which is inserted into a corresponding slot in the system case or slot 732 of plate 331, and screw slot 837 which accepts hold-down screw 336. Opening 838 provides access to I/O connector 226.

Figure 9:
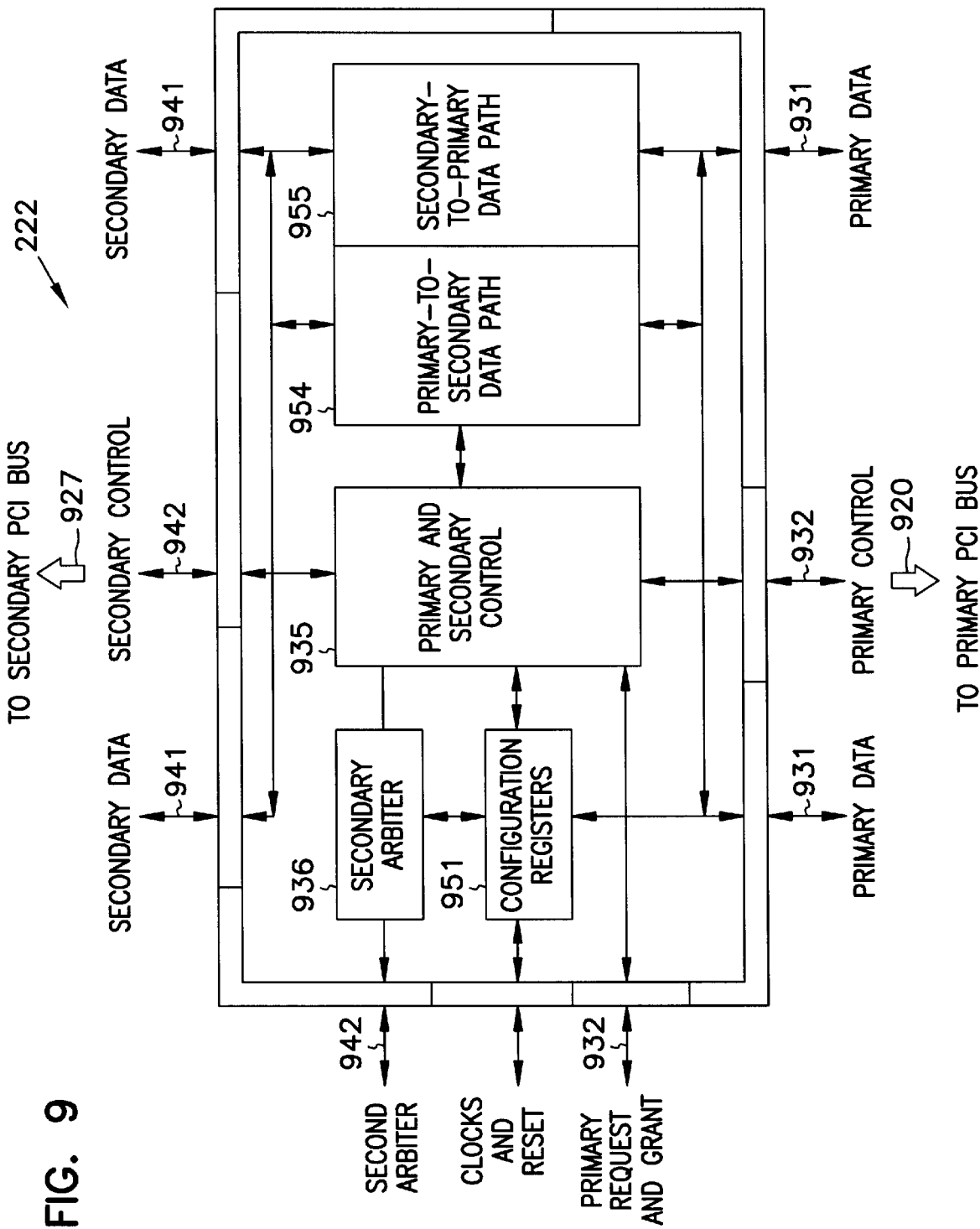
FIG. 9 is a block diagram of PCI bridge circuit 222.

FIG. 9 is a block diagram of a PCI bridge circuit 222 according to one embodiment of the present invention. In this embodiment, PCI bridge circuit 222 includes a Digital Semiconductor 21152 PCI to PCI Bridge Chip available from Digital Equipment Corporation, Maynard, Mass., internet address http://www.digital.com/info/semiconductor. This chip has a primary PCI interface 920, which includes primary data path 931 and primary control path 932, and secondary PCI interface 927, which includes secondary data path 941 and secondary control path 942. Primary control path 932 is coupled to primary-and-secondary control 935, while secondary control path 942 is coupled to both primary-and-secondary control 935 and secondary arbiter 936. Primary-and-secondary control 935 communicates to configuration registers 951. Primary-to-secondary data path 954 and secondary-to-primary data path assist in communicating between primary data path 931 and secondary data path 941. This PCI bridge circuit 222 is described in more detail in Digital Semiconductor 21152 PCI to PCI Bridge Data Sheet, order number EC-QUW9B-TE, and Digital Semiconductor 21152 PCI to PCI Bridge Hardware Implementation: An Application Note, order number EC-QV11A-TE, both available from Digital Equipment Corporation, Maynard, Mass., and both of which are hereby incorporated by reference.

PCI bridge circuit is wired such that primary PCI interface 920 is connected towards the computer system processor (e.g., for the stackable card 220 of FIG. 2A and 2B, this interface is connected to PCI bus 120), and such that secondary PCI interface 927 is connected towards the expansion sockets (e.g., socket 223, FIG. 2B or socket 423, FIG. 4B).

Figure 10A:
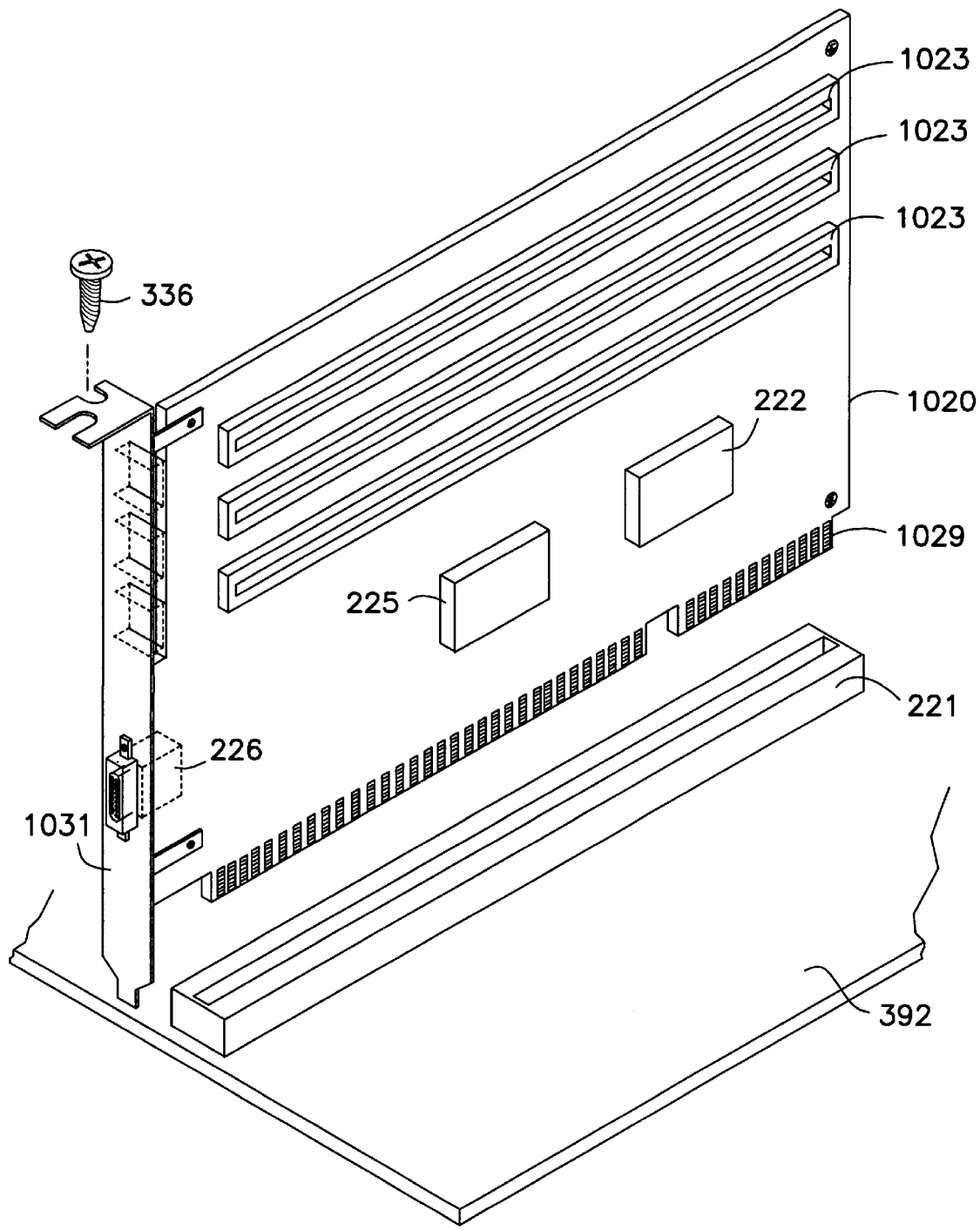
FIGS. 10A, 10B and 10C are isometric, end, and assembled-isometric views, respectively, of a PCI functional bridge card having stacked PCI cards at right angles.
Figure 10B:
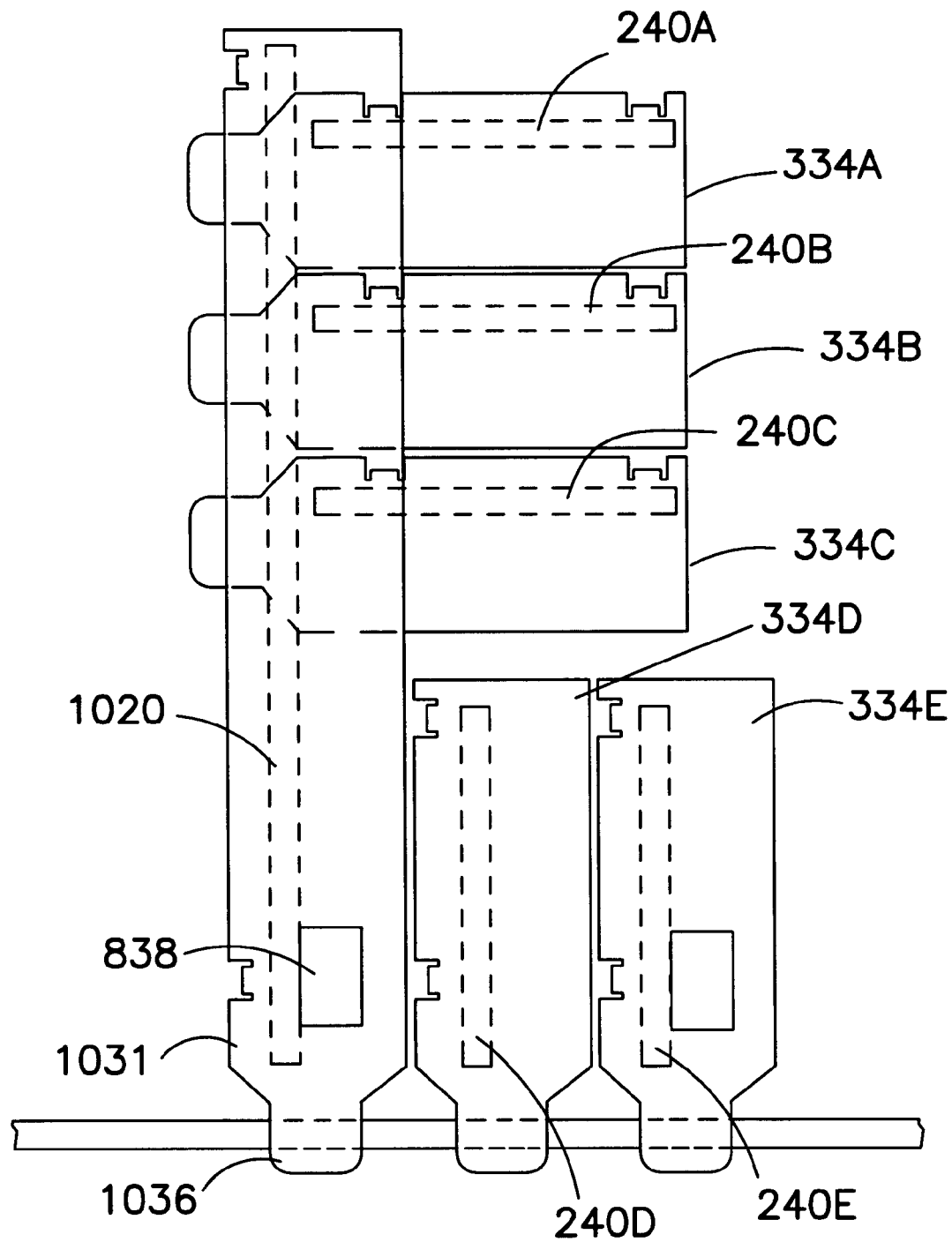
Figure 10C:
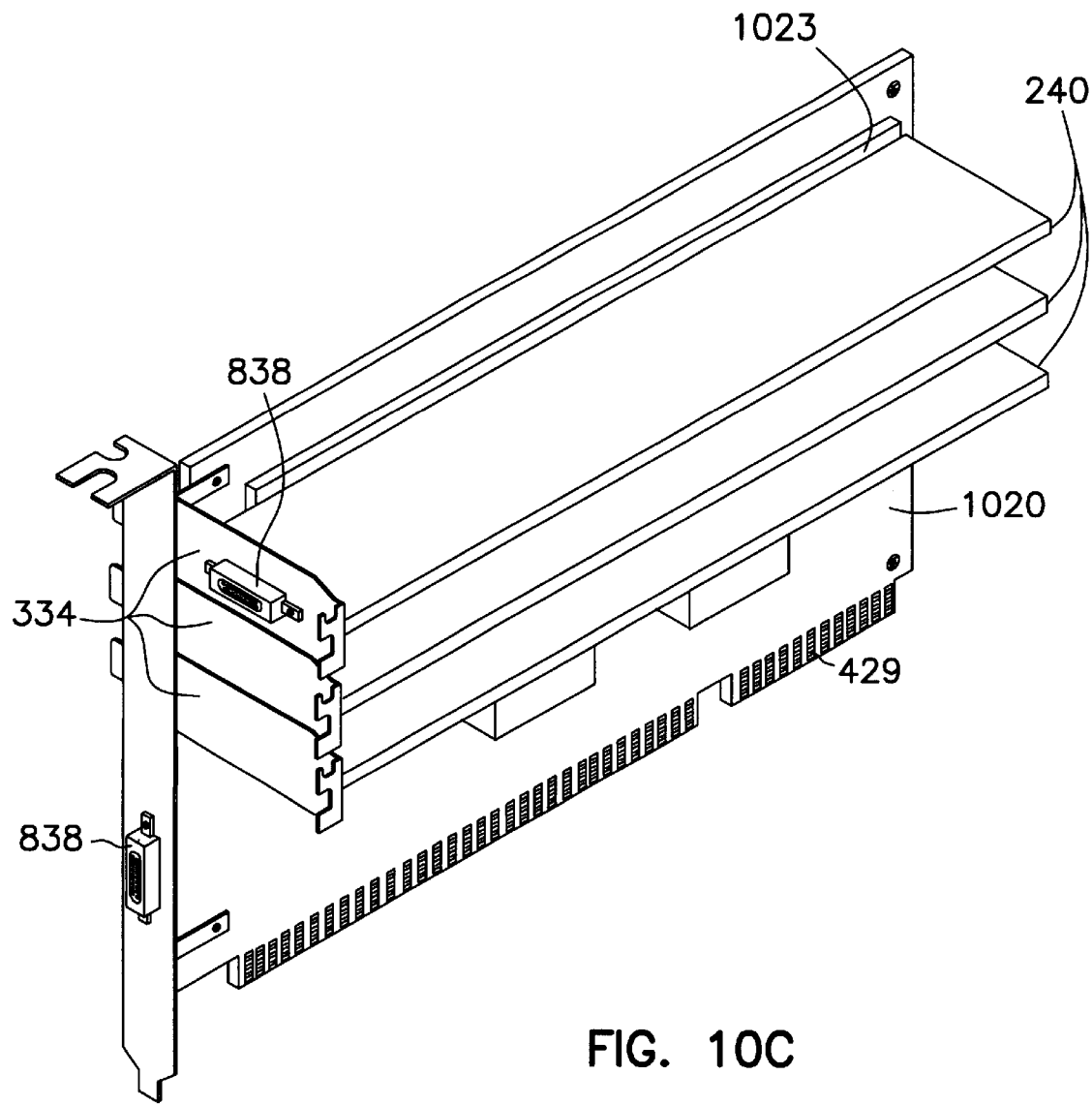

FIGS. 10A, 10B, and 10C are isometric, end, and assembled-isometric views, respectively, of a PCI functional bridge card having stacked PCI cards at right angles. In this embodiment, stackable PCI functional bridge card 1020 is electrically the same as partial-height card 220 (i.e., to card 220A of FIG. 2A, or card 220B of FIG. 2B, depending on the loading requirements determined by the designer), except that one or more (in this case three) PCI connector sockets 1023 are included to replace the single PCI connector socket 223, but these sockets 1023 are mechanically mounted at a right angle to card 1020, and, in one embodiment, at a height such that the horizontally mounted cards 240A, 240B and 240C (see FIGS. 10B and 10C) will clear the vertically mounted cards 240D and 240E that are mounted to motherboard 392 adjacent to card 1020. ("Horizontally" and "vertically" as used herein refer to the orientations as shown in the Figures, and not to the orientation in the systems as assembled; it will be realized that the orientation in the systems as assembled will depend on other choices made by the designer.) In one embodiment (not shown), additional PCI connector sockets 1023 are provided on the surface opposite to the surface of the PCI connector sockets 1023 shown in FIG. 10B, in order that horizontally mounted cards (such as 240A, 240B and 240C) may be mounted on both sides of card 1020. In another embodiment (not shown), additional PCI connector sockets 1023 are provided lower on the same surface of the PCI connector sockets 1023 shown in FIG. 10B, in order that additional horizontally mounted cards (such as 240A, 240B and 240C) may be mounted on card 1020 rather than allowing space for cards 240D and 240E. In yet another embodiment (not shown), card 1020 is made shorter than a full-size PCI card, and PCI connector sockets 1023 are moved lower on the same surface of the PCI connector sockets 1023 shown in FIG. 10B, in order that the horizontally mounted cards 240A, 240B and 240C (even full-sized PCI cards or stacked PCI cards as shown in FIGS. 2 and 4 above) can be packaged in a smaller volume.

Figure 11A:
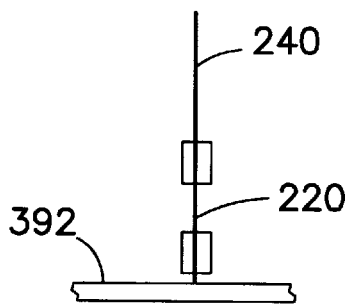
FIGS. 11A, 11B, 11C, 11D, 11E, and 11F are schematic end views, respectively, of various PCI-stacked-card assemblies according to the present invention.
Figure 11B:
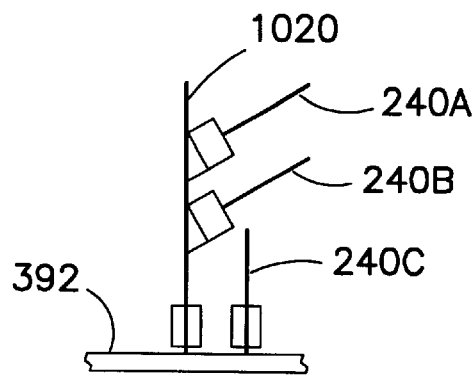
Figure 11C:
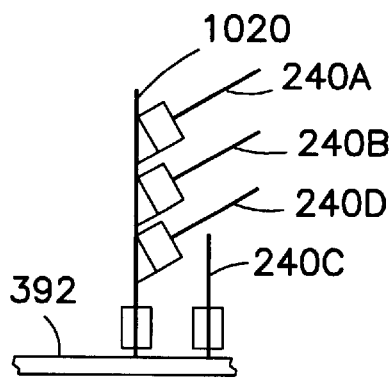
Figure 11D:
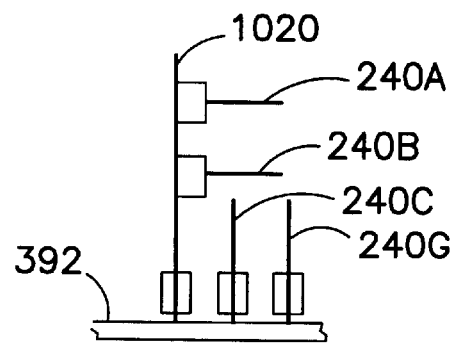
Figure 11E:
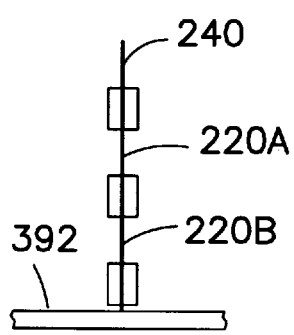
Figure 11F:
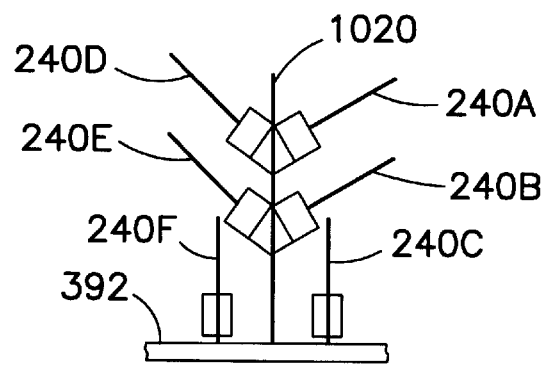

FIGS. 11A, 11B, 11C, 11D, 11E, and 11F are schematic end views, respectively, of various PCI-stacked-card assemblies according to the present invention. FIG. 11A shows an end view of two half-high cards 220 and 240 stacked end-to-end. FIG. 11B shows an end view of two half-high cards 240A and 240B stacked at an oblique angle end-to-side onto stackable PCI functional bridge card 1020, and above half-high card 240C that is connected directly to motherboard 392. FIG. 11C shows an end view of three half-high cards 240A, 240B and 240D stacked at an angle end-to-side onto stackable PCI functional bridge card 1020, and above half-high card 240C that is connected directly to motherboard 392. FIG. 11D shows an end view of two half-high cards 240A and 240B stacked at a right angle end-to-side onto stackable PCI functional bridge card 1020, and above two half-high cards 240C and 240G that are connected directly to motherboard 392. FIG. 11E shows an end view of three one-third-high cards 220A, 220B and 240 stacked end-to-end. FIG. 11F shows an end view of two half-high cards 240A and 240B stacked at an oblique angle end-to-side onto one side of stackable PCI functional bridge card 1020 and above half-high card 240F that is connected directly to motherboard 392, two half-high cards 240D and 240E stacked at an oblique angle end-to-side onto the other side of stackable PCI functional bridge card 1020, and above half-high card 240F that is connected directly to motherboard 392. FIGS. 11A–11F thus show some of the many topological configurations possible for stacked PCI cards according to the present invention.

Conclusion

The present invention provides for PCI bus extension, via the PCI bridge circuit 222, as well as PCI device function, via PCI device circuit 225 and I/O connector 226, all on a single I/O card (220, 420, or 1020). Further, the present invention provides for stackable, partial-height PCI cards (220, 240, and 420). Further, the present invention provides for stackable, partial-height I/O card mounting plates (331, 334, and 335). In yet another embodiment, a functional PCI extension card also provides one or more right-angle connector sockets 1023 in order to allow multiple additional PCI cards at right angles to the functional PCI extension card.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A stackable option card for a computer having a motherboard, the motherboard having a first system bus, wherein the motherboard includes a first-system-bus connector adapted to receive a card that has a third connector by physically connecting the third connector to the first-system-bus connector, the stackable card comprising:

a first connector on the stackable card that connects to the first system bus, wherein the first connector is physically connectable to the first-system-bus connector;

a bus bridge circuit on the stackable card wired to the first connector in order to couple the bus bridge circuit to the first system bus, the bus bridge circuit generating a second system bus, the second system bus being compatible with cards designed for the first system bus;

a second connector on the stackable card connected to the second system bus, wherein the second connector is adapted to connect to the third connector; and a device circuit on the stackable card wired to the first system bus, the device circuit providing an input and/or output function.

2. The stackable option card according to claim 1, further comprising:

an input/output connector mounted to the stackable card and connected to the device circuit, wherein the device circuit transfers signals through the input/output connector.

3. The stackable option card according to claim 1, wherein the first system bus is a PCI bus, the second system bus is a PCI bus, and the bus bridge circuit includes a PCI-to-PCI bridge circuit.

4. The stackable option card according to claim 1, wherein the second connector is a male PCI card-edge connector.

5. The stackable option card according to claim 1, wherein the second connector is a female PCI socket connector mounted to an edge distal to the first connector to accept another option card, where both cards lie in a single plane when connected.

6. The stackable option card according to claim 1, wherein the second connector is a female PCI socket connector mounted to a surface of the stackable card to accept another option card, where the cards are perpendicular to one another when connected.

7. The stackable input-ouput card according to claim 1, wherein the stackable input-ouput card includes a partial height PCI card, and further comprising:

a second stacked partial-height PCI card that is connected to the second connector of the first stackable input-ouput card; and a backplane bracket having a first input/output connector mounted thereto and connected to the stackable input/ouput card, and having a second input/output connector mounted thereto and connected to the second stacked partial-height PCI card.

8. The stackable input-output card according to claim 7, wherein the partial height PCI card and the second stacked partial-height PCI card are both connected to a common backplane bracket.

9. A stackable option card for a computer having a motherboard, the motherboard having a first system bus, wherein the motherboard includes a first-system-bus connector adapted to receive a card that has a third connector by connecting the third connector to the first-system-bus connector, the stackable card comprising:

a first connector on the stackable card that connects to the first system bus, wherein the first connector is physically connectable to the first-system-bus connector;

a bus bridge circuit on the stackable card wired to the first connector in order to couple the bus bridge circuit to the first system bus, the bus bridge circuit generating a second system bus, the second system bus being compatible with cards designed for the first system bus;

a second connector on the stackable card connected to the second system bus, wherein the second connector is adapted to connect to the third connector; and a device circuit on the stackable card wired to the second system bus, the device circuit providing an input/output function.

10. The stackable option card according to claim 9, further comprising:

an input/output connector mounted to the stackable card and connected to the device circuit, wherein the device circuit transfers signals through the input/output connector.

11. The stackable option card according to claim 10, wherein the first system bus is a PCI bus, the second system bus is a PCI bus, and the bus bridge circuit includes a PCI-to-PCI bridge circuit.

12. The stackable option card according to claim 10, wherein the second connector is a male PCI card-edge connector.

13. The stackable option card according to claim 10, wherein the second connector is a female PCI socket connector mounted to an edge diestal to the first connector to accept another option card, where both cards lie in a single plane when connected.

14. The stackable option card according to claim 10, wherein the second connector is a female PCI socket connector mounted to a surface of the stackable card to accept another option card, where the cards are perpendicular to one another when connected.

15. A computer system comprising:

a first system bus;

a processor coupled to the first system bus;

a main memory coupled to the processor;

disk storage coupled to the main memory;

a graphics controller coupled to the main memory; and a first stackable input-output card coupled to the first system bus, the first stackable card comprising:

a first connector on the card that connects to the first system bus;

a bus bridge circuit wired to the first connector in order to couple the bus bridge circuit to the first system bus, the bus bridge circuit generating a second system bus, the second system bus being compatible with cards designed for the first system bus;

a second connector on the card connected to the second system bus, the second connector being compatible with cards designed for the first system bus and having a third connector, wherein the third connector is physically adapted to connect to the third connector.

a device circuit wired to the second system bus, the device circuit providing an input/output function; and an input/output connector mounted to the card and connected to the device circuit, wherein the device circuit transfers signals through the input/output connector.

16. The computer system according to claim 15, wherein the first system bus is a PCI bus, the second system bus is a PCI bus, and the bus bridge circuit includes a PCI-to-PCI bridge circuit.

17. The computer system according to claim 15, wherein the second connector is a male PCI card-edge connector.

18. The computer system according to claim 15, wherein the second connector is a female PCI socket connector mounted to an edge distal to the first connector to accept another stackable option card, where both cards lie in a single plane when connected.

19. The computer system according to claim 15, wherein the second connector is a female PCI socket connector mounted to a surface of the card to accept another stackable option card, where the cards are perpendicular to one another when connected.

20. The computer system according to claim 18, wherein the first stackable input-output card is a partial height PCI card, the system further comprising:
   a second stacked partial-height PCI card that is unsymmetrical to the first stackable input-output card, and that is connected to the second connector.

21. The computer system according to claim 20, wherein the first stackable input-output card includes a first backplane bracket having an input/ouput connector mounted thereto, and the second stackable input-output card includes a second backplane bracket having an input/output connector mounted thereto.

22. The computer system according to claim 18, wherein the first stackable input-output card is a partial height PCI card, the system further comprising:
   a second stacked partial-height PCI card that is symmetrical to the first stackable input-output card, and that is connected to the second connector.

23. The computer system according to claim 21, wherein the first stackable input-output card includes a first backplane bracket having an input/output connector mounted thereto, and the second stackable input-output card includes a second backplane bracket having an input/output connector mounted thereto.

24. The computer system according toclaim 20, wherein the partial height PCI card and the second stacked partial-height PCI card are both connected to a common backplane bracket.

25. The computer system according to claim 21, wherein the first backplane bracket includes an opening, and the second stackable input-output card includes a tab that is inserted into the opening.

26. The computer system according to claim 23, wherein the first backplane bracket includes an opening, and the second stackable input-output card includes a tab that is inserted into the opening.

27. The computer system according to claim 18, wherein the first stackable input-output card is a partial height PCI card, the system further comprising:
   a common backplane bracket; and
   a second stacked partial-height PCI card, wherein the second connector is a female PCI socket connector mounted on to an edge distal to the first connector to accept another stackable option card, where both the first stackable input-output card and the second stacked partial-height PCI card lie in a single plane when connected, wherein the second stacked partial-height PCI card is connected to the second connector, and wherein the first stackable card and the second stacked partial-height PCI card are both connected to the common backplane bracket.

* * * * *